United States Patent
Foster et al.

(10) Patent No.: US 10,073,457 B2
(45) Date of Patent: Sep. 11, 2018

(54) AUTOSCALING ROWS OF TRAVEL FOR AN OFF-ROAD VEHICLE

(71) Applicants: CNH Industrial America LLC, New Holland, PA (US); Autonomous Solutions, Inc., Mendon, UT (US)

(72) Inventors: Christopher A. Foster, Mohnton, PA (US); Bret T. Turpin, Wellsville, UT (US); Daniel John Morwood, Petersboro, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/179,597

(22) Filed: Jun. 10, 2016

(65) Prior Publication Data

US 2017/0357261 A1    Dec. 14, 2017

(51) Int. Cl.
G05D 1/02      (2006.01)
A01B 69/00     (2006.01)
A01B 69/04     (2006.01)

(52) U.S. Cl.
CPC ........... *G05D 1/0212* (2013.01); *A01B 69/00* (2013.01); *A01B 69/008* (2013.01); *G05D 1/0278* (2013.01); *B60Y 2200/22* (2013.01); *B60Y 2300/10* (2013.01); *G05D 2201/0201* (2013.01)

(58) Field of Classification Search
CPC .............. G05D 1/0212; G05D 1/0278; G05D 2201/0201; A01B 69/00; B60Y 2200/22; B60Y 2300/10
See application file for complete search history.

(56) References Cited

U.S. PATENT DOCUMENTS

| | | |
|---|---|---|
| 6,055,799 A | 5/2000 | Savoie et al. |
| 7,505,848 B2 | 3/2009 | Flann et al. |
| 7,715,979 B2 | 5/2010 | Dix |
| 7,877,182 B2 | 1/2011 | Dix et al. |
| 8,060,269 B2 | 11/2011 | Dix |
| 8,265,826 B2 | 9/2012 | Feller et al. |
| 8,296,052 B2 | 10/2012 | Dix et al. |
| 8,498,788 B2 | 7/2013 | Kondekar |
| 8,954,216 B2 | 2/2015 | Yazaki et al. |

(Continued)

FOREIGN PATENT DOCUMENTS

| | | |
|---|---|---|
| EP | 2238819 A1 | 10/2010 |
| FR | 2530114 A1 | 1/1984 |
| WO | 1988009610 | 12/1998 |

OTHER PUBLICATIONS

International Search Report & Written Opinion dated Sep. 29, 2017 in PCT Application No. PCT/US2017/026615.

*Primary Examiner* — Rodney Allen Butler
(74) *Attorney, Agent, or Firm* — Rebecca L. Henkel; Rickard K. DeMille

(57) ABSTRACT

A control system for an off-road vehicle configured to traverse an off-road vehicle through a field by determining whether a partial row exist or contour differences exist between opposite edges if a route of traversal is used. If a partial row or a contour difference exist adjust the route to increase overlap of rows of the off-road vehicle to distribute the width of the field evenly among the rows or incrementally adjust each row from a first contour of a first edge to a second contour of a second edge.

20 Claims, 7 Drawing Sheets

(56) References Cited

U.S. PATENT DOCUMENTS

| | | | |
|---|---|---|---|
| 2004/0193348 A1* | 9/2004 | Gray | A01B 69/008 |
| | | | 701/50 |
| 2010/0262342 A1* | 10/2010 | Dix | A01B 69/008 |
| | | | 701/50 |
| 2012/0101725 A1* | 4/2012 | Kondekar | A01B 69/00 |
| | | | 701/445 |
| 2012/0215410 A1* | 8/2012 | McClure | A01B 79/005 |
| | | | 701/50 |
| 2013/0191017 A1* | 7/2013 | Peake | G05D 1/0227 |
| | | | 701/410 |
| 2015/0321694 A1 | 11/2015 | Nelson, Jr. et al. | |
| 2015/0359163 A1 | 12/2015 | Nelson, Jr. | |
| 2017/0357269 A1* | 12/2017 | Downing | G05D 1/0088 |

* cited by examiner

AUTOSCALING ROWS OF TRAVEL FOR AN OFF-ROAD VEHICLE

BACKGROUND

The present disclosure relates generally to autoscaling rows of travel for an off-road vehicle.

Off-road vehicles, such as agricultural tractors may be operated in a variety of locations. For example, a tractor may be used to cut swaths in rows in a field. For instance, the tractor may tow an implement that mows hay to be harvested. However, a width of the field may not be an integer multiple of a width of the swath cut by the tractor. The swaths are generally cut in rows having a width of a swath-cut-width of an implement towed by the tractor for a single pass, but such cutting paths may result in a final row that has a width that is significantly less that the swath-cut-width. A final, partial row having a width significantly smaller than the swath-cut-width may be relatively difficult or impossible to cut without also cutting other portions of the field (e.g., windrows that enable crops such as hay to dry) that would normally not be cut. Furthermore, cutting such portions may be tough on machinery. For example, recutting windrows may potentially make further processing more difficult by plugging or clogging machinery. Furthermore, additional cutting of the windrow may cause more frequent maintenance that may be costly and significantly time-consuming, thereby reducing the efficiency of field operations.

BRIEF DESCRIPTION

In one embodiment, a control system for an off-road vehicle includes memory storing instructions and a processor configured to execute the instructions to cause the processor to determine whether a first contour of a first edge of a field differs from a second contour of a second edge of the field that is on an opposite side of the field from the first edge. The instructions are also configured to cause the processor to, if the first contour differs from the second contour, determine a pre-planned route of travel through the field for the off-road vehicle. The pre-planned route includes a first pass of the off-road vehicle that follows the first contour at the first edge and subsequent passes of the off-road vehicle to incrementally shift from the first contour to the second contour using partial overlaps of passes of an implement towed by or integrated into the off-road vehicle. The pre-planned route also includes a final pass of the off-road vehicle that follows the second contour at the second edge. The instructions are also configured to cause the processor to control the off-road vehicle to traverse the field based at least in part on the pre-planned route.

In another embodiment, a control system for an off-road vehicle includes memory storing instructions and a processor configured to execute the instructions. The instructions are configured to cause the processor to determine whether a field width is not an integer multiple of a swath width of an implement and if the field width is not an integer multiple of the swath width, determine a route to establish an overlap of passes of the rows so that the field width is an integer multiple of non-overlap portions of each pass. The instructions are also configured to cause the processor to control the off-road vehicle to traverse the field based at least in part on the route.

In a further embodiment, a method for controlling an off-road vehicle through a field includes mapping, via a processor, a field using a spatial locating device of the off-road vehicle. The method also includes determining, via the processor, from the map whether a field width is not an integer multiple of a swath width of an implement. The method further includes, if the field width is not an integer multiple of the swath width, determining, via the processor, a route to establish an overlap of passes of the rows so that the field width is an integer multiple of non-overlap portions of each pass. Furthermore, the method includes controlling, via the processor, the off-road vehicle to traverse the field based at least in part on the route.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
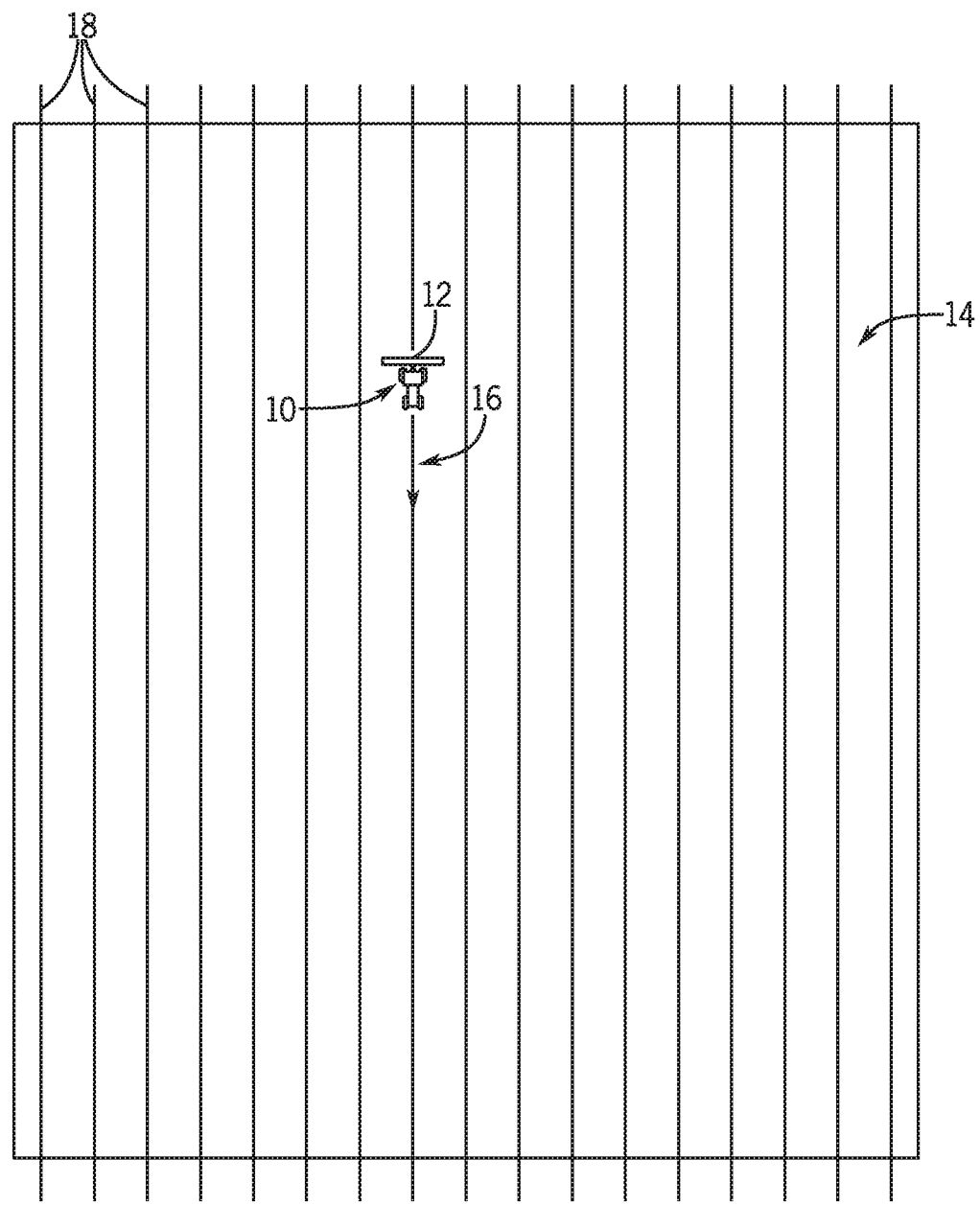
FIG. 1 is a schematic diagram of an embodiment of an off-road vehicle and an agricultural implement within an agricultural field.

FIG. 1 is a schematic diagram of an embodiment of an off-road vehicle 10 and an agricultural implement 12 within an agricultural field 14. The off-road vehicle 10 (e.g., tractor or other prime mover) is configured to tow the agricultural implement 12 throughout the field 14 along a direction of travel 16. In certain embodiments, the off-road vehicle 10 is directed (e.g., via an operator or an automated system) to traverse the field along substantially parallel rows 18. However, it should be appreciated that the off-road vehicle may be directed to traverse the field along other routes in alternative embodiments. For example, at least a portion of the paths may follow a contour located at one edge of the field 14 that is iteratively phased out or in to form a path that follows line or contour located at an opposite edge of the field.

As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, a cutting tool, or a harvesting tool, among others. While the agricultural implement 12 is towed and/or pushed by the off-road vehicle 10 in the illustrated embodiment, it should be appreciated that in alternative embodiments, the agricultural implement may be integrated within the off-road vehicle 10.

Furthermore, the field 14 may have a width that is not an integer multiple of a swath width of the implement 12. In other words, if the field 14 is traversed using parallel rows 18 having a width equal to a width of operation of the implement, a final partial row is formed that is only a portion of the width of the other rows 18. Such partial rows may be impractical to traverse without causing undesirable effects to other portions of the field 14. For example, if the crop being cut is hay, cutting the partial row may be difficult or impossible to complete without cutting into outer windrows of the field 14. As noted above, recutting the outer windrows may potentially make further processing more difficult by plugging or clogging machinery and/or causing more frequent maintenance that may be costly and significantly time-consuming, thereby reducing the efficiency of field operations.

Figure 2:
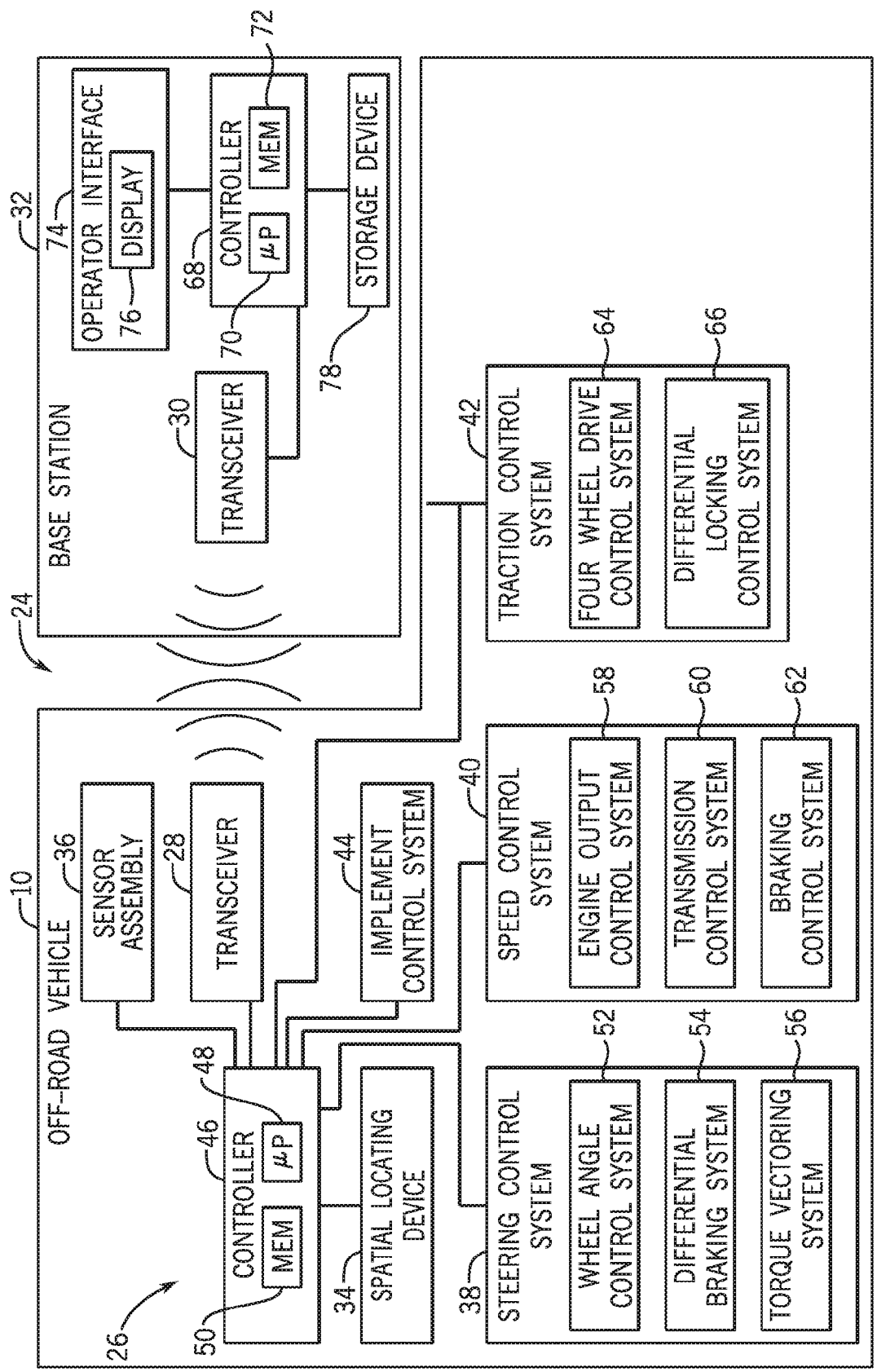
FIG. 2 is a schematic diagram of an embodiment of a control system that may be utilized to control the off-road vehicle and the agricultural implement of FIG. 1 within the field of FIG. 1.

FIG. 2 is a schematic diagram of an embodiment of a control system 24 that may be utilized to control the off-road vehicle 10 and the agricultural implement of FIG. 1. In the illustrated embodiment, the control system 24 includes a vehicle control system 26 (e.g., mounted on the off-road vehicle 10), and the off-road vehicle 10 includes a first transceiver 28 configured to establish a wireless communication link with a second transceiver 30 of a base station 32. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

In the illustrated embodiment, the off-road vehicle 10 includes a spatial locating device 34, which is mounted to the off-road vehicle 10 and configured to determine a position of the off-road vehicle 10. As will be appreciated, the spatial locating device may include any suitable system configured to determine the position of the off-road vehicle, such as a global positioning system (GPS) receiver, for example. In certain embodiments, the spatial locating device 34 may be configured to determine the position of the off-road vehicle relative to a fixed point within the field (e.g., via a fixed radio transceiver). Accordingly, the spatial locating device 34 may be configured to determine the position of the off-road vehicle relative to a fixed global coordinate system (e.g., via the GPS) or a fixed local coordinate system. In certain embodiments, the first transceiver 28 is configured to broadcast a signal indicative of the position of the off-road vehicle 10 to the transceiver 30 of the base station 32. Using the position of the off-road vehicle 10 during traversal of the field 14, a map may be made of the field 14. For example, as the off-road vehicle 10 or another lighter scouting vehicle travels around a portion of the field 14, the control system 24 and/or the vehicle control system 26 may generate a map of the field 14. Specifically, in some embodiments, the off-road vehicle 10 or scouting vehicle may be directed to travel around a perimeter of the field 14 to determine the outer bounds of the field 14 and then to determine a traversal route. Additionally or alternatively, a map may be updated in during operation of the off-road vehicle 10 to store location of objects that interfere with operation, such as roads, structures, fixtures (e.g., irrigation systems), or other objects that may be fixed within the field 14.

In addition, the off-road vehicle 10 includes a sensor assembly 36. In certain embodiments, the sensor assembly is configured to facilitate determination of conditions of the off-road vehicle 10 and/or the field 14. For example, the sensor assembly 36 may include multiple sensors (e.g., infrared sensors, ultrasonic sensors, magnetic sensors, etc.) configured to monitor a rotation rate of a respective wheel or track and/or a land speed of the off-road vehicle. The sensors may also track operating levels (e.g., temperature, fuel level, etc.) of the off-road vehicle 10. Furthermore, the sensors may track conditions in and around the field, such as temperature, weather, wind speed, humidity, objects in the field, and other such conditions.

In the illustrated embodiment, the off-road vehicle 10 includes a steering control system 38 configured to control a direction of movement of the off-road vehicle 10, and a speed control system 40 configured to control a speed of the off-road vehicle 10. In addition, the off-road vehicle 10 includes a traction control system 42 configured to control distribution of power from an engine of the off-road vehicle to wheels or tracks of the off-road vehicle, and an implement control system 44 configured to control operation of an implement (e.g., towed by the off-road vehicle 10). Furthermore, the vehicle control system 26 includes a controller 46 communicatively coupled to the first transceiver 28, to the spatial locating device 34, to the sensor assembly 36, to the steering control system 38, to the speed control system 40, to the traction control system 42, and to the implement control system 44. In certain embodiments, the controller 46 is configured to receive a location of the off-road vehicle 10 and move the vehicle based at least in part on the location of the off-road vehicle 10 and a route of traversal through the field 14.

In certain embodiments, the controller 46 is an electronic controller having electrical circuitry configured to process data from the transceiver 28, the spatial locating device 34, the sensor assembly 36, or a combination thereof, among other components of the off-road vehicle 10. In the illustrated embodiment, the controller 46 includes a processor, such as the illustrated microprocessor 48, and a memory device 50. The controller 46 may also include one or more storage devices and/or other suitable components. The processor 48 may be used to execute software, such as software for controlling the off-road vehicle 10, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 48 may include one or more reduced instruction set (RISC) processors.

The memory device 50 may include a volatile memory, such as random access memory (RAM), and/or a nonvolatile memory, such as read-only memory (ROM). The memory device 50 may store a variety of information and may be used for various purposes. For example, the memory device 50 may store processor-executable instructions (e.g., firmware or software) for the processor 48 to execute, such as instructions for controlling the off-road vehicle 10. The storage device(s) (e.g., nonvolatile storage) may include ROM, flash memory, a hard drive, or any other suitable optical, magnetic, or solid-state storage medium, or a combination thereof. The storage device(s) may store data (e.g., field maps), instructions (e.g., software or firmware for controlling the off-road vehicle, etc.), and any other suitable data.

In the illustrated embodiment, the steering control system 38 includes a wheel angle control system 52, a differential braking system 54, and a torque vectoring system 56. The wheel angle control system 52 may automatically rotate one or more wheels or tracks of the off-road vehicle (e.g., via hydraulic actuators) to steer the off-road vehicle along a path through the field (e.g., around mapped objects in a field). By way of example, the wheel angle control system 52 may rotate front wheels/tracks, rear wheels/tracks, and/or intermediate wheels/tracks of the off-road vehicle, either individually or in groups. The differential braking system 54 may independently vary the braking force on each lateral side of the off-road vehicle to direct the off-road vehicle along the path through the field. Similarly, the torque vectoring system 56 may differentially apply torque from the engine to wheels and/or tracks on each lateral side of the off-road vehicle, thereby directing the off-road vehicle along the path through the field. While the illustrated steering control system 38 includes the wheel angle control system 52, the differential braking system 54, and the torque vectoring system 56, it should be appreciated that alternative embodiments may include one or more of these systems, in any suitable combination. Further embodiments may include a steering control system 38 having other and/or additional systems to facilitate directing the off-road vehicle along the path through the field (e.g., an articulated steering system, etc.).

In the illustrated embodiment, the speed control system 40 includes an engine output control system 58, a transmission control system 60, and a braking control system 62. The engine output control system 58 is configured to vary the output of the engine to control the speed of the off-road vehicle 10. For example, the engine output control system 58 may vary a throttle setting of the engine, a fuel/air mixture of the engine, a timing of the engine, and/or other suitable engine parameters to control engine output or a combination thereof. In addition, the transmission control system 60 may adjust an input-output ratio within a transmission to control the speed of the off-road vehicle. Furthermore, the braking control system 62 may adjust braking force, thereby controlling the speed of the off-road vehicle 10. While the illustrated speed control system 40 includes the engine output control system 58, the transmission control system 60, and the braking control system 62, it should be appreciated that alternative embodiments may include one or two of these systems, in any suitable combination. Further embodiments may include a speed control system 40 having other and/or additional systems to facilitate adjusting the speed of the off-road vehicle.

In the illustrated embodiment, the traction control system 42 includes a four-wheel drive control system 64 and a differential locking control system 66. The four-wheel drive control system 64 is configured to selectively engage and disengage a four-wheel drive system of the off-road vehicle. For example, in certain embodiments, the off-road vehicle may include a four wheel drive system configured to direct engine output to the rear wheels/tracks while disengaged, and to direct engine output to the front wheels/tracks and the rear wheels/tracks while engaged. In such embodiments, the four wheel drive control system 64 may selectively instruct the four wheel drive system to engage and disengage to control traction of the off-road vehicle. In certain embodiments, the off-road vehicle may include intermediate wheels/tracks positioned between the front wheels/tracks and the rear wheels/tracks. In such embodiments, the four-wheel drive control system may also control the transfer of engine power to the intermediate wheels/tracks.

In addition, the differential locking control system 66 is configured to selectively engage a differential locking system of at least one locking differential between a respective pair of wheels/tracks. For example, in certain embodiments, a locking differential is positioned between the rear wheels/tracks and configured to transfer engine power to the rear wheels/tracks. While the differential locking system is disengaged, the differential is unlocked. As a result, the rotational speed of one rear wheel/track may vary relative to the rotational speed of the other rear wheel/track. However, when the differential locking system is engaged, the differential is locked. As a result, the rotational speeds of the rear wheels/tracks may be substantially equal to one another. In certain embodiments, a locking differential may be positioned between the front wheels/tracks and/or between intermediate wheels/tracks. In certain embodiments, the differential locking control system 66 is configured to independently engage and disengage the differential locking system of each locking differential. While the illustrated traction control system 42 includes the four-wheel drive control system 64 and the differential locking control system 66, it should be appreciated that alternative embodiments may include only one of these systems. Further embodiments may include a traction control system 42 having other and/or additional systems to facilitate control of traction of the off-road vehicle 10.

The implement control system 44 is configured to control various parameters of the agricultural implement towed by the off-road vehicle. For example, in certain embodiments, the implement control system 44 may be configured to instruct an implement controller (e.g., via a communication link, such as a CAN bus or ISOBUS) to adjust a penetration depth of at least one ground-engaging tool of the agricultural implement. By way of example, the implement control system 44 may instruct the implement controller to reduce the penetration depth of each tillage point on a tilling implement, or the implement control system 44 may instruct the implement controller to disengage each opener disc/blade of a seeding/planting implement from the soil. Reducing the penetration depth of at least one ground-engaging tool of the agricultural implement may reduce the draft load on the off-road vehicle. Furthermore, the implement control system 44 may instruct the implement controller to transition the agricultural implement between a working position and a transport portion, to adjust a flow rate of product from the agricultural implement, or to adjust a position of a header of the agricultural implement (e.g., a harvester, etc.), among other operations.

In certain embodiments, the vehicle controller 46 may directly control the penetration depth of at least one ground-engaging tool of the agricultural implement. For example, the off-road vehicle controller 46 may instruct a three-point hitch (e.g., via a three-point hitch controller) to raise and lower the agricultural implement or a portion of the agricultural implement relative to the soil surface, thereby adjusting the penetration depth of the at least one ground engaging tool of the agricultural implement. In addition, the off-road vehicle controller 46 may instruct a hydraulic control system to adjust hydraulic fluid pressure and/or flow to one or more actuators on the agricultural implement, thereby controlling the penetration depth of respective ground engaging tool(s). In some embodiments, the vehicle controller 46 may instruct other operating machinery of the implement (e.g., cutting machinery) when to begin and when to stop operation.

As previously discussed, the off-road vehicle 10 is configured to communicate with the base station 32 via the transceivers 28 and 30. In the illustrated embodiment, the base station includes a controller 68 communicatively coupled to the base station transceiver 30. The controller 68 is configured to output commands and/or data to the off-road vehicle 10. For example, as discussed in detail below, the controller 68 may be configured to determine a map of the field and/or a route of the vehicle controller 46 through the field, thereby enabling the vehicle controller to direct the vehicle though the field 14. In addition, the controller 68 may output start and stop commands to the vehicle controller 46, and/or the controller 68 may instruct the off-road vehicle to follow a selected/planned path through the field 14 based on the map and the location of the vehicle 10, which may be determined at the controller 46 and/or the controller 68.

In certain embodiments, the controller 68 is an electronic controller having electrical circuitry configured to process data from certain components of the base station 32 (e.g., the transceiver 30). In the illustrated embodiment, the controller 68 includes a processor, such as the illustrated microprocessor 70, and a memory device 72. The processor 68 may be used to execute software, such as software for providing commands and/or data to the off-road vehicle controller 46, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors. The memory device 72 may include a volatile memory, such as RAM, and/or a nonvolatile memory, such as ROM. The memory device 72 may store a variety of information and may be used for various purposes. For example, the memory device 72 may store processor-executable instructions (e.g., firmware or software) for the processor 70 to execute, such as instructions for providing commands and/or data to the off-road vehicle controller 46.

In the illustrated embodiment, the base station 32 includes a user interface 74 communicatively coupled to the controller 68. The user interface 74 is configured to present data from the one or more off-road vehicles and/or the agricultural implements to an operator (e.g., data associated with operation of the off-road vehicle, data associated with operation of the agricultural implement, etc.). The user interface 74 may also enable the user to input information about the field 14 and/or the crops that may alter the route through the field. For example, if the crop is a row crop (e.g., corn), the operator may indicate such information and a width of each swath may be fixed. However, if the crop is a non-row crop (e.g., hay; small grain such as wheat, barley, grass seed, canola, etc.); pulse crops (peas, lentils, etc.)), the information may be input and the width of each swath may be used to traverse the field 14 in a path alternative to the rows that would be used for row crops since non-row crop swaths may be adjusted without interfering with row operations. The user interface 74 is also configured to enable an operator to control certain functions of the off-road vehicle (e.g., starting and stopping the off-road vehicle, instructing the off-road vehicle to follow a route through the field, etc.). In the illustrated embodiment, the user interface includes a display 76 configured to present information to the operator, such as the position of the off-road vehicle 10 within the field, the speed of the off-road vehicle, and the path of the off-road vehicle, among other data. The display 76 may include touch inputs and/or the user interface may rely on other input devices, such as a keyboard, mouse, or other human-to-machine input devices. In addition, the user interface 74 (e.g., via the display 76, via an audio system, etc.) is configured to notify the operator of the determined route to be used to traverse the field 14. The user interface 74 may also alert the user of various operating conditions that affect the operation of the off-road vehicle 10. For example, in certain embodiments, the user interface 74 may alert the operator if the off-road vehicle is experiencing a substantial degree of slippage.

In the illustrated embodiment, the base station 32 includes a storage device 78 communicatively coupled to the controller 68. The storage device 78 (e.g., nonvolatile storage) may include ROM, flash memory, a hard drive, or any other suitable optical, magnetic, or solid-state storage medium, or a combination thereof. The storage device(s) may store data (e.g., field maps), instructions (e.g., software or firmware for commanding the off-road vehicle, etc.), and any other suitable data.

While the vehicle control system 26 of the control system 24 includes the off-road vehicle controller 46 in the illustrated embodiment, it should be appreciated that in alternative embodiments, the vehicle control system 26 may include the base station controller 68. For example, in certain embodiments, control functions of the vehicle control system 26 may be distributed between the off-road vehicle controller 46 and the base station controller 68. In further embodiments, the base station controller 68 may perform a substantial portion of the control functions of the vehicle control system 26. Indeed, any processes of the controllers 46 and 68 may be allocated to either controller in at least some embodiments. Furthermore, at least part of the processes described herein may be performed via a cloud-based service or other remote computing.

Figure 3:
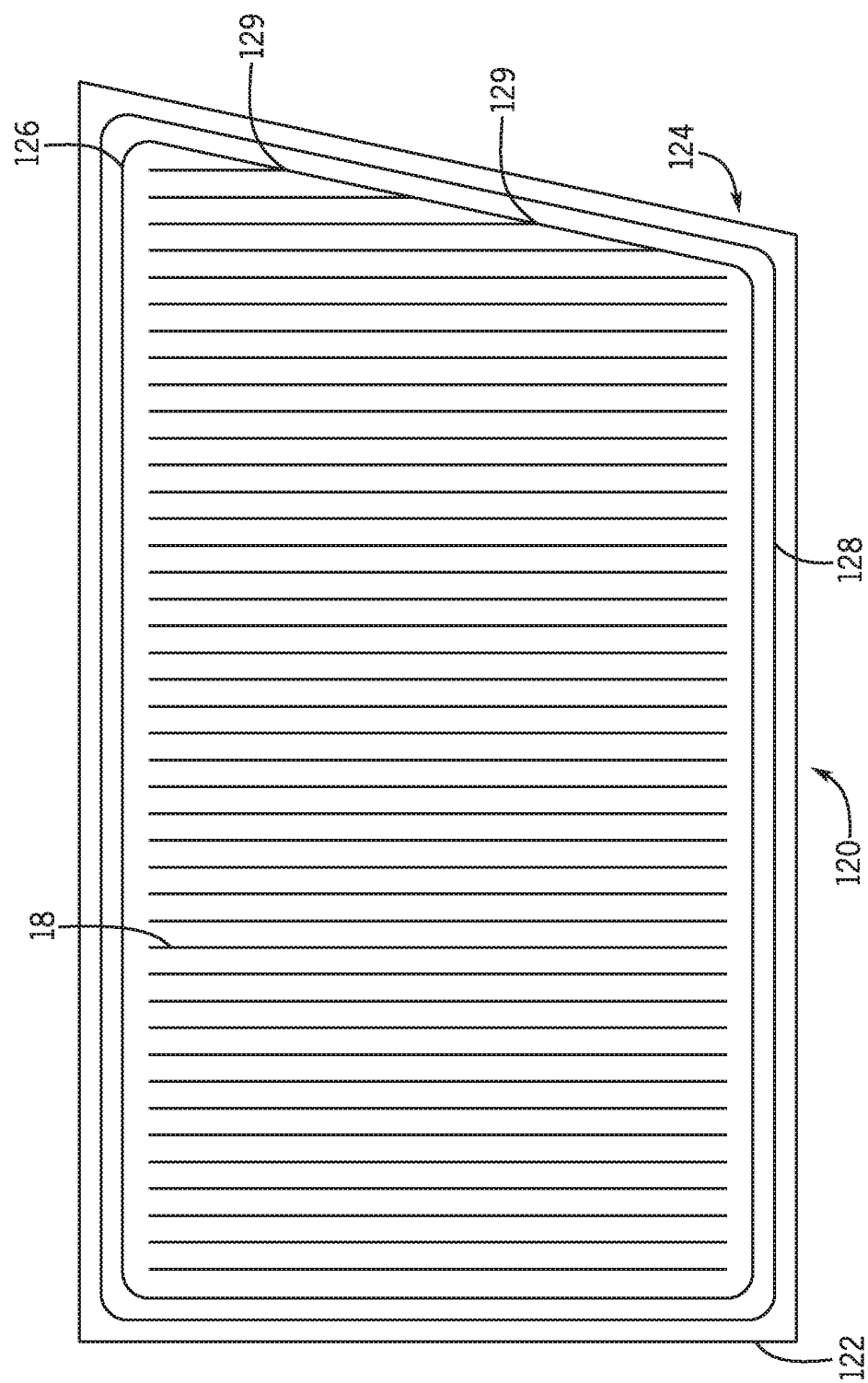
FIG. 3 is a diagram of an embodiment of a field having a sharp corner with opposite edges having contour differences.

With the foregoing in mind, as the off-road vehicle 10 and the agricultural implement 12 traverse the field, the off-road vehicle 10 and the agricultural implement 12 may encounter various field shapes that are non-rectangular and/or have widths unequal to a an integer multiple of a width of a single pass of the vehicle 10. For example, FIG. 3 is a diagram of a field 120 having a trapezoidal shape with a squared edge 122 and a non-squared edge 124. If the field 120 is traversed along substantially parallel rows 18, traversing a field with a non-squared corner 126 *o* may be relatively difficult or impossible without engaging outer windrows 128. Specifically, rows 18 that terminate at an angle with the edge 124 of the field 120 may cause engaging (e.g., cutting) and/or reengaging portions that are not to be reengaged (e.g., windrows). Although the illustrated field 120 includes a trapezoidal shape, some embodiments may have any shape that has a sharp or acute angle in one or more corners and/or includes one or more contours on at least one side of the field 120 causing the rows 18 to terminate at a windrow at a substantially non-perpendicular angle.

Figure 4:
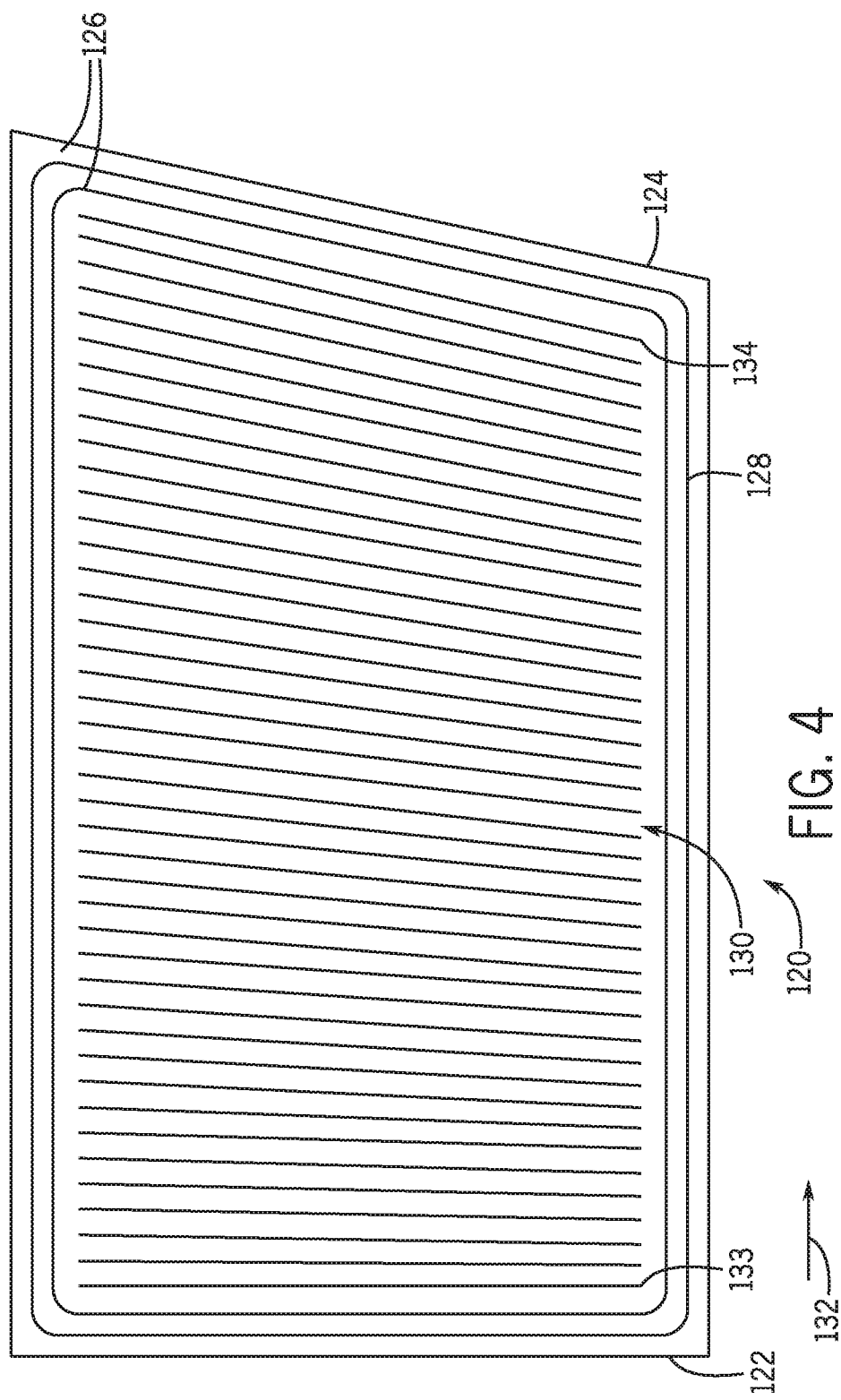
FIG. 4 is a diagram of an embodiment of a route through the field of FIG. 3 that enables processing of rows at edges of the field.

Instead of merely engaging swaths of a maximum width, a pre-planned route, as illustrated in FIG. 4 and discussed below, may be created that follows a first contour of the edge 122 near the edge 122 and follows a second contour of the opposite edge 124 near the edge 124 with a transition zone 130 that transitions from the first contour to the second contour as consecutive passes are performed, each pass increasing distant from the edge 122 along a horizontal direction 132 in the field 120. For example, a first row 133 may have the first contour while a second row 134 may have the second contour, and all rows in between the row 133 and the row 134 may have a contour that is a combination of the first and second contours to a contour that is between the first and second contours. Such transitions may cause some overlap of the passes of the implement 12, but the inefficiency of traveling over previously traversed portions of the field 120 is offset by enabling processing of the field 120 due to the non-squared corner 126. As discussed previously, the contours may be tracked by traveling at least a portion (e.g., a perimeter) of the field 120 with the off-road vehicle 10 to map the field 120 to determine the pre-planned route using location information (e.g., derived using GPS data) during a mapping process for the field 120.

Figure 5:
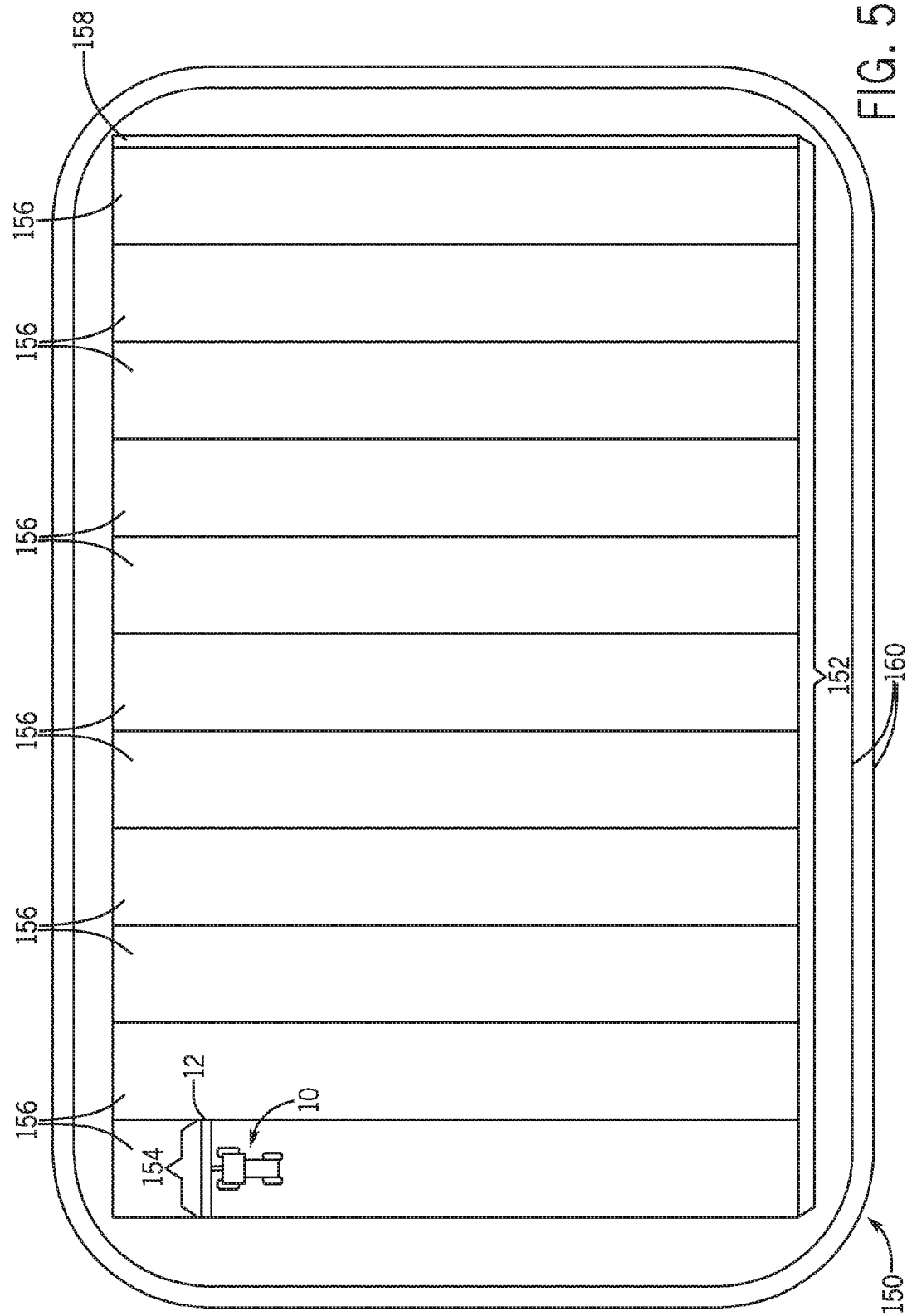
FIG. 5 is a diagram of an embodiment of a field having a remaining partial row after being traversed by an implement without overlap subsequent passes of the implement.

Also, as noted above, partial rows (e.g., rows that are less than a full swath width) may be impossible or impractical to process (e.g., cut) without also processing other portions of the field 14 that have already been processed. For example, FIG. 5 is a diagram of an embodiment of a field 150 that has a width 152 to be processed in rows that is not an integer multiple of a swath width 154, in which the swath width 154 is the width of a single pass of the implement 12 through the field 150. For example, if the implement 12 is a hay-cutting implement, the swath width 154 is the width of hay cut in a single pass of the implement 12 in the field 150. As illustrated, a cutting route uses the swath width 154 to define row width. In other words, in the cutting route illustrated in the field 150, minimal to no overlap exists between adjacent rows. If the width of the field 150 is an integer multiple of the swath width 154 such a method may be the most efficient. Moreover, if the crop type is a row crop (e.g., corn), the rows may be spaced equally due to fixed-width implements that plant the rows in specific positions in relation to each other. However, if the crop is a non-row crop (e.g., hay) and the field 150 has a width (e.g., width 152) that is not an integer multiple of the swath width 154, a partial row may not be processed (e.g., cut) properly without potentially causing processing of portions that are not to be processed (e.g., windrows). Furthermore, although the illustrated embodiment of the field 150 includes eleven full rows 156 each having a swath width 154 and one partial row 158, it should be noted that the processes discussed herein are applicable to any field that has a width 152 that is not an integer multiple of a swath width 154 of the implement 12. As previously noted, the partial row 158 may be difficult to process without effecting portions 160 (e.g., windrows) that would not need to be processed a second time.

Figure 6:
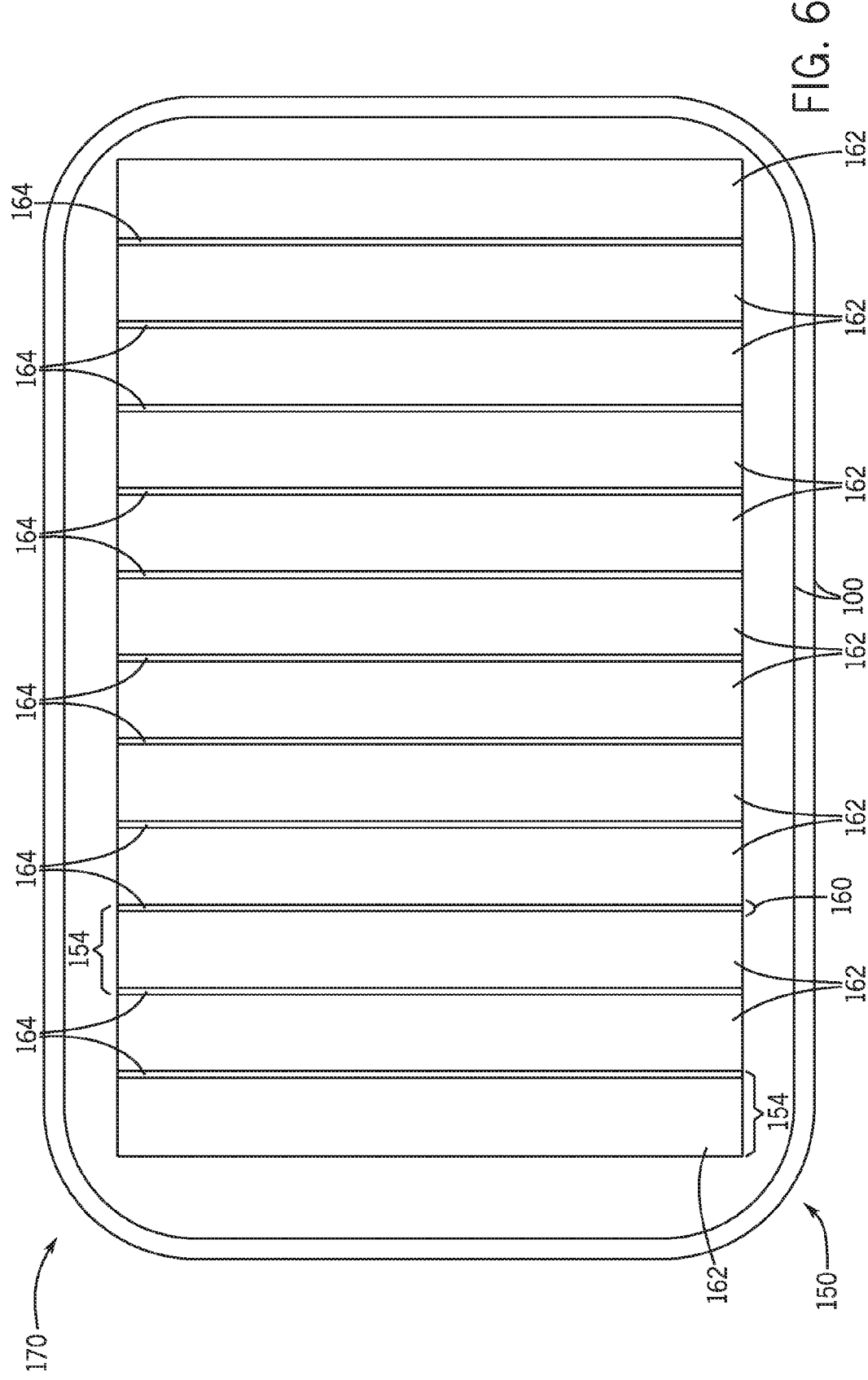
FIG. 6 is a diagram of the field of FIG. 5 which has been traversed by an implement along an embodiment of a route that causes the implement to overlap passes to eliminate the partial row of FIG. 5.

FIG. 6 is a diagram of an embodiment of a pre-planned route 170 that may be used to process crops in the field 150. Specifically, the pre-planned route 170 enables processing of material corresponding to the partial row 158 of FIG. 5. The illustrated embodiment of the pre-planned route 170 includes twelve overlapping rows 162 that overlap with adjacent rows in an overlap region 164 having an overlap width 166. In some embodiments, the overlap width 166 may be calculated using the following equation:

$$W_{OL} = \frac{W_{PR}}{n} \quad \text{(Equation 1)}$$

where $W_{OL}$ is the overlap width 166 of the overlap regions 164, $W_{PR}$ is the width of the partial row that would remain if cut using the swath width 154 as the width of the rows, and n is the number of full rows that would be cut if using swath width 154 as the width of the rows. In turn, $W_{PR}$ may be calculated using the following equation:

$$W_{PR} = \mod\left(\frac{W_T}{W_{SW}}\right) \quad \text{(Equation 2)}$$

where $W_T$ is the total width of the field to be processed and $W_{SW}$ is the swath width of the implement 12. In other words, the would-be partial row 158 is redistributed among the rows such that the overlaps sum up to the partial row enabling processing of the entire field without risking additional processing to portions not to be processed. If $W_{PR}$ is equal to zero, the width of the portion of the field to be processed is an integer multiple of the swath width of the implement 12.

Figure 7:
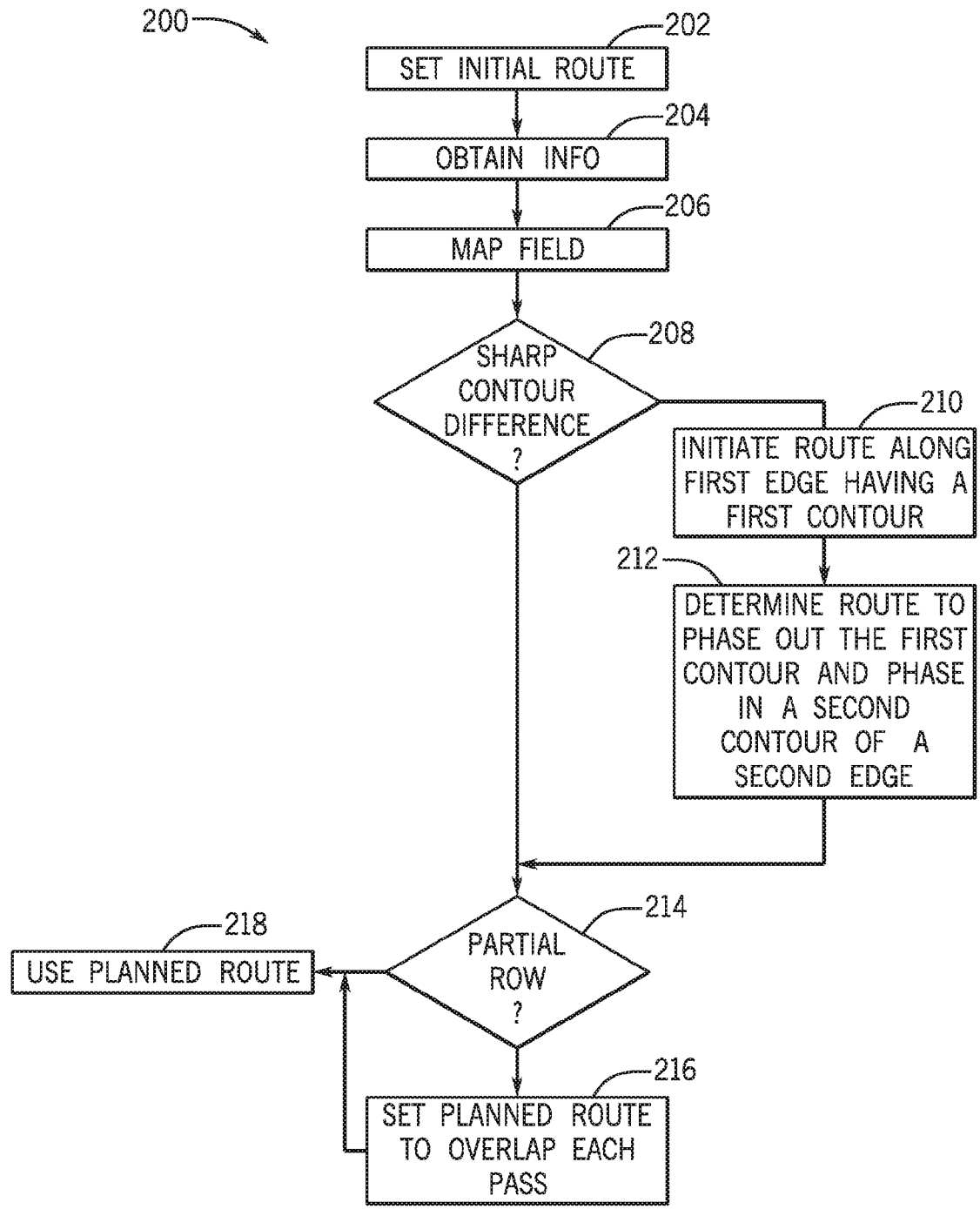
FIG. 7 is a flow diagram view of an embodiment of a process for controlling an off-road vehicle through a field.

FIG. 7 is a flow diagram of a process 200 for operating the off-road vehicle 10 and the implement 12. The process 200 may be at least performed by the controller 46, the controller 68, a remote processor (e.g., cloud service), or some combination thereof. A route for a field may default to a default route, such as parallel rows having a width equal to a swath width of the implement 12 (block 202). The process 200 includes obtaining information about the field 14, 150 (block 204). For example, the display 76 may present instructions, e.g., as part of an initialization process for the field, for an operator to circumnavigate a perimeter or traverse an area of the field 14, 150. The spatial locating device 34 determines a location for the off-road vehicle 10 during the initialization process. The controllers 46 and/or 68 track the location of the off-road vehicle 10 using this information. Using the location information, a map is made of the field (block 206). The map may include a two-dimensional boundary of the field, a two-dimensional graph of the locations of the off-road vehicle 10, a three-dimensional graph of the terrain, or a combination thereof.

The map may be used to determine a different route of travel based on various factors of the field. For example, if the field has contours that are different on opposing sides, and/or a width of the field to be processed is not an integer multiple of the swath width of the implement, the pre-planned route through the field may be determined (e.g., the default path may be modified). In analyzing the map, a determination is made whether the field includes any sharp corners (block 208). For example, a determination is made whether the field includes contours that would cause one or more rows to terminate at an edge of the field at an angle that is substantially non-perpendicular (e.g., acute or obtuse) to set an appropriate route to be traveled through the field. As noted above, such angles may cause the one or more rows to be difficult or impossible to process without processing undesired portions (e.g., windrows).

If the field includes any sharp corners or contours, the pre-planned route is established to follow a first contour at a first edge of the field (block 210). The pre-planned route is also determined to phase out or in the contour of the first edge while oppositely phasing in or out a second contour of a second edge opposing the first edge (block 212), through each subsequent pass/row. For example, the first contour may be a straight line along the first edge, and the second contour may be a line angling away from or toward the first edge. In other words, the second edge is not parallel to the first edge. In such a change in angle from the first contour to the second contour, in some embodiments, the angle for a specific row may be determined as the angle of intersection between the first and second edges if the edges were extended scaled by a lateral distance from the first edge divided by the total width of the field and modifying the angle of the first edge by calculated quotient. In other words, the angle between the first and second edge may be distributed equally throughout the rows in the field.

The map is also analyzed to determine whether a partial row exists. Specifically, the map may be analyzed to determine whether the width of the field to be processed is an integer multiple of the swath width of the implement (block 214). For example, if the swath width of the implement is twenty-four feet, integer multiples of the swath width would be 48, 72, 96, 120, 144, 168, 192 feet, and so on. Any other widths of the field may result in a partial row. If a partial row would exist, the pre-planned route may be determined such that each row/pass of the implement overlaps an adjacent row/pass (block 216). In other words, the overlaps distribute the width of a partial row into overlap areas to enable the entire field to processed (e.g., cut) without processing additional areas that are not to be processed (e.g., existing windrows). Once the pre-planned route has been determined, the pre-planned route is used to control the implement (block 218). For example, the tractor may be controlled to direct the implement along the route. In some embodiments, the map may also be used to determine when machinery (e.g., cutting machinery) of the implement is to begin operation (e.g., when the off-road vehicle 10 and/or the implement 12 has entered into the area of the field to be processed) or stop operation (e.g., when the off-road vehicle 10 and/or the implement 12 has exited the area of the field to be processed).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system for an off-road vehicle, comprising:
memory storing instructions;
a processor configured to execute the instructions to cause the processor to:
determine whether a first contour of a first edge of a field differs from a second contour of a second edge of the field that is on an opposite side of the field from the first edge; and
if the first contour differs from the second contour, determine a pre-planned route of travel through the field for the off-road vehicle, wherein the pre-planned route includes:
a first pass of the off-road vehicle that follows the first contour at the first edge;
subsequent passes of the off-road vehicle to incrementally shift from the first contour to the second contour using partial overlaps of passes of an implement towed by or integrated into the off-road vehicle; and
a final pass of the off-road vehicle that follows the second contour at the second edge; and
control the off-road vehicle to traverse the field based at least in part on the pre-planned route.

2. The control system of claim 1, wherein the first contour is different from the second contour when an acute angle is formed in a corner of the field between the first edge of the field and an adjacent edge of the field.

3. The control system of claim 1, comprising a user interface that provides information to an operator and receives selections from the operator.

4. The control system of claim 3, wherein the user interface is configured to receive a selection of a crop type.

5. The control system of claim 4, wherein the determination of contour differences is used only when a non-row crop type is selected.

6. The control system of claim 5, wherein non-row crop type comprises hay, wheat barley, grass seed, canola, peas, or lentils.

7. The control system of claim 1, wherein the incremental shift from the first contour to the second contour for each pass is a function of a distance of the pass from the first edge.

8. The control system of claim 1, wherein the instructions are configured to cause the processor to:
determine whether a partial row would exist using the pre-planned route; and
if a partial row would exist, adjust the determined pre-planned route to eliminate the partial row.

9. The control system of claim 8, wherein a width of the partial row is divided between overlap areas of each pass of the implement.

10. A control system for an off-road vehicle, comprising:
memory storing instructions;
a processor configured to execute the instructions to cause the processor to:
determine whether a field width is not an integer multiple of a swath width of an implement;
if the field width is not an integer multiple of the swath width, determine a route to establish an overlap of passes of the rows so that the field width is an integer multiple of non-overlap portions of each pass, wherein establishing the overlap comprises determining a width of the overlap as a function of the field width and the swath width; and
control the off-road vehicle to traverse the field based at least in part on the route.

11. The control system of claim 10, comprising:
the off-road vehicle; and
a base station.

12. The control system of claim 11, wherein the processor is located in the off-road vehicle, in the base station, or distributed between both the base station and the off-road vehicle.

13. The control system of claim 10, wherein the width of the overlap for each row is calculated using the following equation:

$$W\_OL = W\_PR/n$$

where $W\_OL$ is an overlap width for each row, $W\_PR$ is a width of a partial row that would exist if the field were traversed using rows having widths equal to the swath width, and n is the number of full rows that would exist if the field were traversed using rows having widths equal to the swath width.

14. The control system of claim 13, wherein the width of the partial row is calculated using the following equation:

$$W\_PR = \mod(W\_T/W\_SW)$$

where $W\_T$ is a total width of the field to be processed, and $W\_SW$ is the swath width of the implement.

15. The control system of claim 10, comprising a user interface configured to provide information to an operator and to receive selections from the operator, wherein the user interface is configured to receive a selection of a crop type.

16. The control system of claim 15, wherein the determination of the route is made only if the field width is not an integer multiple of the swath width and a non-row crop is selected.

17. The control system of claim 10, comprising a spatial locating device that indicates a location of the off-road vehicle that is configured to enable mapping the field for generation and adjustment of the pre-planned route.

18. A method for controlling an off-road vehicle through a field, comprising:
mapping, via a processor, a field using a spatial locating device of the off-road vehicle;

determining, via the processor, from the map whether a field width is not an integer multiple of a swath width of an implement;

if the field width is not an integer multiple of the swath width, determining, via the processor, a route to establish an overlap of passes of the rows so that the field width is an integer multiple of non-overlap portions of each pass, wherein a width of the overlap is established based at least in part on a ratio between the swath width and the field width; and controlling, via the processor, the off-road vehicle to traverse the field based at least in part on the route.

19. The method of claim 18, comprising:

determining, via the processor, whether a first contour of a first edge of the field differs from a second contour of a second edge of the field that is on an opposite side of the field from the first edge; and if the first contour differs from the second contour, determine, via the processor, a contoured route of travel through the field for the off-road vehicle, wherein the contoured route includes:

a first pass of the off-road vehicle that follows the first contour at the first edge;

subsequent passes of the off-road vehicle to incrementally shift from the first contour to the second contour using partial overlaps of passes of an implement towed by or integrated into the off-road vehicle; and a final pass of the off-road vehicle that follows the second contour at the second edge; and control, via the processor, the off-road vehicle to traverse the field based at least in part on the contoured route.

20. The method of claim 18, wherein mapping a field using a spatial locating device of the off-road vehicle includes circumnavigating a perimeter of the field.

* * * * *